United States Patent [19]

Oku et al.

[11] Patent Number: 5,729,303
[45] Date of Patent: Mar. 17, 1998

[54] MEMORY CONTROL SYSTEM AND PICTURE DECODER USING THE SAME

[75] Inventors: Masuo Oku, Kamakura; Yukitoshi Tsuboi, Yokohama; Hiroshi Gunji, Tokyo; Yoshinobu Igarashi, Niiza, all of Japan

[73] Assignee: Hitachi, Ltd., Tokyo, Japan

[21] Appl. No.: 606,535

[22] Filed: Feb. 23, 1996

[30] Foreign Application Priority Data

Feb. 23, 1995 [JP] Japan ................. 7-034910

[51] Int. Cl.⁶ .................................................. H04N 7/26
[52] U.S. Cl. .................. 348/716; 348/714; 348/423; 348/715
[58] Field of Search .................................. 348/569, 715, 348/716, 718, 714, 717, 719, 720, 721; 345/203; H04N 5/14, 7/26, 4/23

[56] References Cited

U.S. PATENT DOCUMENTS

| | | | |
|---|---|---|---|
| 4,598,284 | 7/1986 | Ikegami et al. | 340/750 |
| 4,980,765 | 12/1990 | Kudo et al. | 358/160 |
| 5,353,120 | 10/1994 | Lee | 348/555 |
| 5,386,233 | 1/1995 | Keith | 348/407 |
| 5,623,314 | 4/1997 | Retter et al. | 348/423 |

OTHER PUBLICATIONS

*Journal of Television Society of Japan*, vol. 48, No. 1, pp. 44–49 (1994) entitled "MPEG 2/H.262" by Hiroshi Watanabe.

Vol. 48, No. 1, pp. 31–37 (1994) entitled "LSIs for Highly Efficient Video Coding" by Kiichi Matsuda et al.

*Primary Examiner*—Glenton B. Burgess
*Attorney, Agent, or Firm*—Evenson, McKeown, Edwards & Lenahan, P.L.L.C.

[57] ABSTRACT

In order to increase a coded data buffer size and provide an OSD area within a 16 Mbit memory for picture signals of NTSC and PAL systems, a display data area of the memory is made $2(N+1)/4N$ times a frame when a picture size is large.

19 Claims, 10 Drawing Sheets

5,729,303

1

MEMORY CONTROL SYSTEM AND PICTURE DECODER USING THE SAME

BACKGROUND OF THE INVENTION

1. Field of the Invention

The present invention relates to a picture decoder for decoding a coded picture data obtained by compressing a picture data of an interlaced picture and coding it by means of the high efficiency coding system and, particularly, to a memory control system used in the picture decoder.

2. Prior Art Description

Due to the fact that an interlaced picture contains a large amount of picture data, it has been tried to exclude redundancy to thereby reduce a data transmission cost and/or recording cost by compressing and coding the picture data according to the high efficiency coding system and then transmitting and/or recording the coded data.

An example of the high efficiency coding system is MPEG system which is standardized by ISO/SC29/WG11 and H. Watanabe, "MPEG2/H.262", Journal of Television Society of Japan, Vol. 48, No. 1, pp. 44–49 (1994) discloses an example of the high efficiency coding technology of MPEG system.

FIG. 2 illustrates the display order of frames and the coding order of the frames in the MPEG system, respectively. As shown in FIG. 2, frames of picture data are grouped to I (intra) pictures (I1 and I2) which are to be coded without prediction using reference picture, P (predictive) pictures (P1, P2) which are predicted by using only pictures preceding thereto in the display order as reference pictures to be referenced and B (bidirectional) pictures (B1, B2, B3, B4, B5, B6) which are predicted by using pictures preceding and succeeding thereto as reference pictures.

In FIG. 2, the display order of the picture frames is I1, B1, B2, P1, B3, B4, P2, B5, B6. The I picture frame I1 is displayed first without prediction and then the B picture B1 is displayed with prediction using the frame I1 and the P picture frame P1. That is, since, when the B picture is to be decoded, there must be two reference pictures, one precedent to the B picture in the display order and the other succeeding thereto, the coding is performed after the order of picture frames is changed in a predetermined manner.

Further, as shown in FIG. 3, a single picture corresponding to one frame of television signal which contains a luminance signal of 480 vertical lines×720 horizontal pixels and two kinds of color signal having 240 vertical lines×360 horizontal pixels in the case of the NTSC signal. In the case of the PAL signal, it contains a luminance signal of vertically 576 lines×horizontally 720 pixels and two kinds of color signal of vertically 288 lines×horizontally 360 pixels. Further, the picture is processed in macro block (MB) unit containing a luminance signal of vertically 16 lines× horizontally 16 pixels and the two kinds of color signal of vertically 8 lines×horizontally 8 pixels and it is coded sequentially horizontally from left to right of the picture in macro block unit, as shown in FIG. 3.

FIGS. 4, 5 and 6 show a decoding of the coded data according to the MPEG system. As shown in FIG. 4, on the decoding side, the coded data supplied in the coding order is decoded at a rate of 1 picture per frame period, as shown in an upper portion of FIG. 4. The decoded picture data is temporarily stored in a memory and rearranged such that its order becomes the same as the display order, as shown in a lower portion of FIG. 4. The decoded data of the I1 and P1

2 pictures are to be used as reference data during decoding of the B1 picture and, therefore, a picture data of the 2 pictures, the I1 and P1 pictures, must be stored in the memory.

Further, 1 frame is coded as one picture as mentioned above. Therefore, when one frame is constituted with interlaced two fields as in the case of the television signal, even the B picture can not be displayed simultaneously with its decoding. Since a frame must be transformed into a field data, display of the data must be delayed from its decoding by at least 0.5 frame period. This requires that the decoded data is stored in the memory once in order to transform the frame data into the field data and therefore the memory has to have an extra memory area corresponding to 1 picture for such temporary storage of the decoded data.

FIG. 5 shows an example of the memory necessary for the decoding. The memory shown in FIG. 5 is a 16 Mbits memory having a data width of 16 bits and a memory area of 512 columns×2048 rows. In FIG. 5, the memory area is divided for a picture of the PAL system. That is, a total of 608 rows including 405 rows for luminance signal and 203 rows (raised to unit fractions lower than decimal point) for color signal are required for each of three frames of the picture and the remnant, 224 rows, is used as a coded data buffer for temporarily storing the coded data in decoding it. The coded data is read out from the coded data buffer at a rate of 1 picture per frame period and decoded. The capacity of the coded data buffer is 1,835,008 bits which is determined as an upper limit in the MPEG system in order to guarantee an appropriate coding and decoding operation in any combination of a coder and a decoder.

Further, FIG. 6 illustrates a transformation of the frame data into the field data. The decoded data of the B picture is written in a B frame area of the memory shown in FIG. 5 and is read out therefrom after a time corresponding to 0.5 frame (1 field). Since the decoding is performed in the macro block unit, the decoded data has a fluctuation of 16 lines wide with respect to address number. The decoded data of both a first field and a second field is written in a time period of about 2 fields, as shown by solid lines in FIG. 6. On the other hand, the read operation is performed in scan line unit in the field order. Therefore, the read operation is performed every two lines in address number, resulting in that a read speed in address number becomes about twice the write speed.

Further, since the same memory area is used for both the write and read operations as shown by the time period T2 to T4 in FIG. 6, some measure must be taken in order to avoid the address conflict between read and write. In order to avoid such conflict in, for example, the time period T3 in FIG. 6, the write operation must be started after the read operation completes and the write operation is started with a delay corresponding to 8 lines from the completion of the read operation by taking the fluctuation of 16 lines wide during the write operation into consideration. At the end of the time period T4, the write operation must be completed before a time corresponding to 8 lines from the end of the read operation. As mentioned above, in order to guarantee a continuity of display, the read operation should be performed preferentially. Therefore, the write operation in a location in which there is a conflict between read and write may be stopped, resulting in that a time period assigned to the write operation and hence the decoding of the coded data is shorten correspondingly thereto.

As mentioned above, in the prior art, it is possible to realize a picture decoder which utilizes the capacity of 16 Mbits effectively. Particularly, since the memory having capacity of 4 Mbits or 16 Mbits is popular commercially, the above mentioned prior art is effective in reducing the cost of the picture decoder.

On the other hand, the OSD (On Screen Display) technique for displaying a decoded picture overlaid with characters and/or graphics is required as a user interface of the picture decoder.

However, in order to realize such OSD, an extra memory area is required in the memory. Therefore, when the above mentioned picture is of the PAL system, the size of which is considerably large, the capacity of the required memory may exceed the capacity of 16 Mbits of the popular memory.

The capacity of 1,835,008 bits of the coding data buffer is one required when the decoding is performed ideally. Since, in practice, there is a decoding delay, the capacity of the coding data buffer should be larger than the above mentioned capacity.

It is further desired that a single picture decoder can decode coded data of pictures having different sizes such as a picture of the NTSC system and a picture of the PAL system and further can continuously perform the decoding operation for a portion of the coded data at which the pictures having different size are connected.

SUMMARY OF THE INVENTION

An object of the present invention is to solve the above mentioned problems inherent to the prior art.

Another object of the present invention is to provide a picture decoder having a memory of 16 Mbits in which a memory area for the OSD data and a coded data buffer area of 1,835,008 bits or more are provided so that a decoding operation of coded data including a connecting portion of coded data of pictures having different sizes is performed continuously.

Another object of the present invention is to provide a memory control system for controlling write and read operations of coded data with respect to the memory of the picture decoder such that the decoding operation for the coded data including a connecting portion of coded data of pictures having different sizes is performed continuously.

In order to achieve the above objects, according to the present invention, a memory control system is provided, which comprises a memory including a plurality of memory layers corresponding in number to pictures having different sizes and having different memory area patterns each including two reference picture data areas each having a capacity of at least 1 frame, a display data area for converting a frame structure data into a field structure data, a coded data buffer area for temporarily storing the coded data and an OSD data area for an on-screen-data for displaying a picture data overlaid with other data and means for automatically switching the memory layer such that the capacity of the display data area is at least 1 frame when the picture size is small and smaller than 1 frame when the picture size is large.

The coded data buffer areas in the different memory section patterns are arranged in identical address spaces.

In the plurality of the memory layers, the address space of the OSD data area of the memory layer corresponding to a case where the picture size is maximum includes the address space of the OSD data area of the memory layer corresponding to a case where the picture size is minimum, completely, and makes the size of the OSD data area substantially proportional to the size of the coded picture.

Further, in the memory layers corresponding to cases where the picture size is large, the display data area is divided to 2N+1 segments, where N is an integer. A read and write operations with respect to each segment are performed in picture data unit corresponding to ¼N of 1 frame and the capacity of the display data area is made equal to 2(N+1)/4N of 1 frame.

The two reference picture data areas store a reference data for motion compensation in the inter-frame coding and the data is read out when the motion is to be compensated for. The display data area is written with a frame structure picture data in the coded block unit and the picture data is read out as a field structure picture data in synchronism with the interlace scan. By providing a plurality of memory layers having different area patterns correspondingly to respective sizes of the coded picture with display data areas being made smaller with increase of the picture size, it becomes possible to provide the coded data buffer area or the OSD area in a memory having a limited capacity even when the picture size is large.

Further, the coded data buffer areas in the memory layers having different area patterns for the large and small picture sizes are the same in capacity and location, so that, even in a junction between sequences of pictures having different sizes, it is possible to perform write and read operations of a new sequence of coded data immediately after the coded data of a preceding sequence by merely supplying continuous addresses.

Further, a size of the OSD area is set correspondingly to the size of the coded picture, so that it becomes possible to display the OSD data on substantially the whole display screen.

Further, since, in the memory layer having area pattern corresponding to large picture size, the display data area having a capacity corresponding to 2(N+2)/4N of 1 frame is divided to 2(N+1) segments, where N is an integer, and a read and write operations with respect to each segment is performed with picture data unit corresponding to ¼N of 1 frame, it is possible to minimize an area in which there may be a conflict between write and read operations. Therefore, the influence of the decoding timing on the display timing is minimized.

DETAILED DESCRIPTION OF THE PREFERRED EMBODIMENTS

An embodiment of the present invention will be described with reference to the accompanying drawings.

Figure 1:
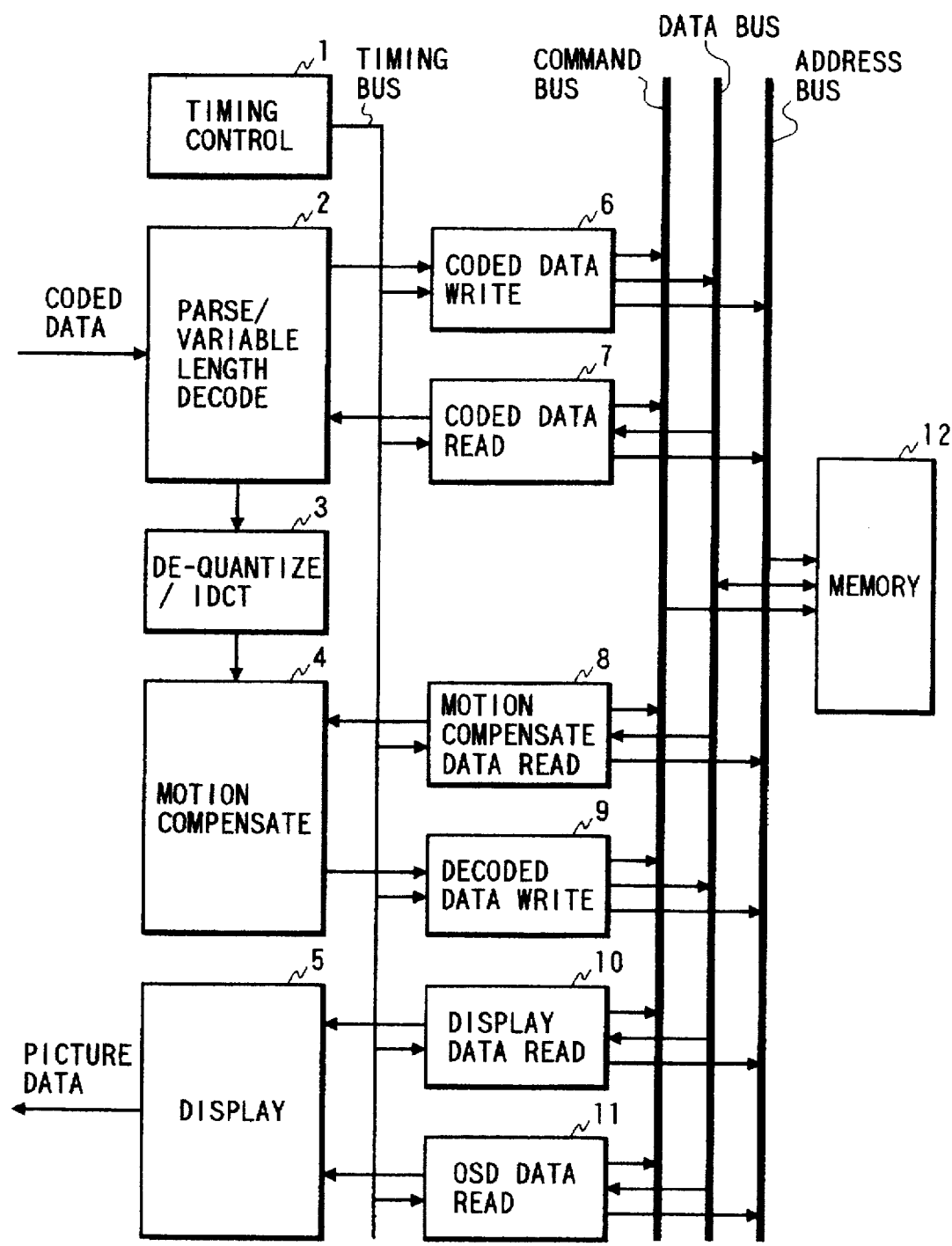
FIG. 1 shows an embodiment of a picture decoder according to the present invention.
Figure 2:
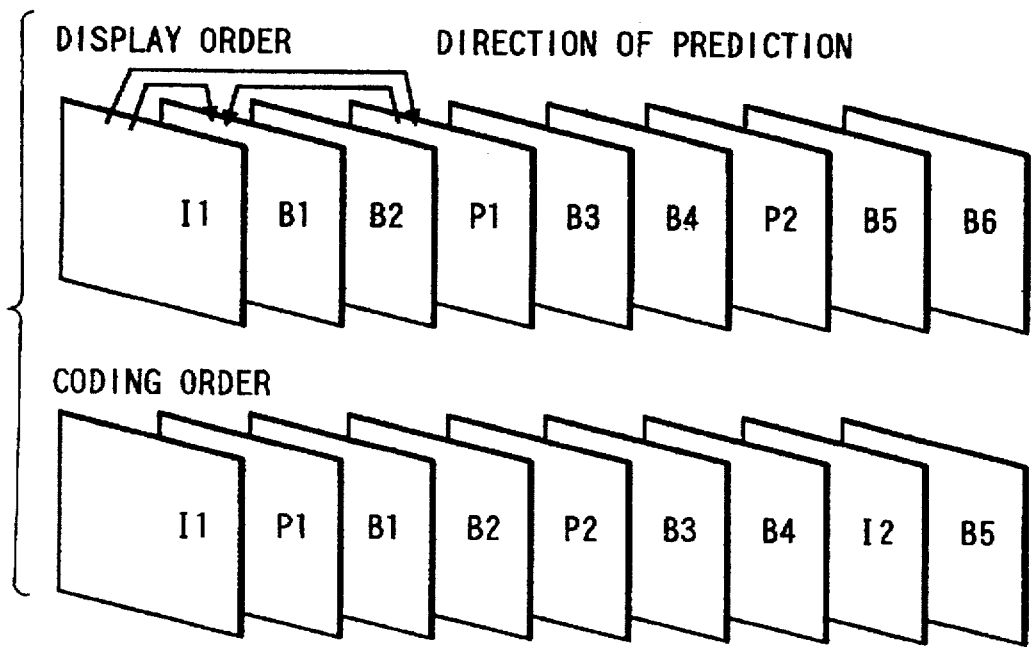
FIG. 2 illustrates a picture coding system.
Figure 3:
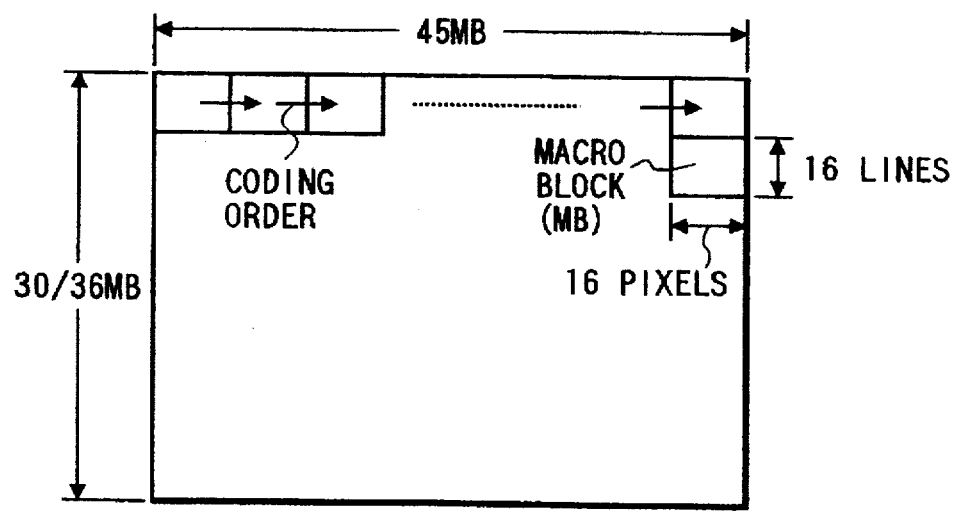
FIG. 3 shows the size of picture to be coded.

FIG. 1 shows an embodiment of a picture decoder according to the present invention, which comprises a timing control circuit 1, a parser/variable length decoder 2, an de-quantizer/IDCT (inverse discrete cosine transformation) circuit 3, a motion compensation circuit 4, a display circuit 5, a coded data write control circuit 6, a coded data read control circuit 7, a motion compensation data read control circuit 8, a decoded data write control circuit 9, a display data read control circuit 10, an OSD data read control circuit 11 and a memory 12.

A coded data is supplied to the parser/variable length decoder 2 and then, through the coded data write control circuit 6, to a coded data buffer area 125 (FIGS. 7 and 8) of the memory 12 in which the coded data is stored. The timing control circuit 1 functions mainly to regulate a data bus conflict of the memory 12. The coded data read control circuit 7 reads out in first-in and first-out the coded data stored in the coded data buffer area 125 in synchronism with the timing of the display system at a rate of 1 picture (=frame) per frame period.

The coded data read out from the memory 12 is supplied to the parser/variable length decoder 2 again. A parser portion of the parser/variable length decoder 2 extracts a coding mode information in a header portion of the coded data and supplies it to a variable length decoding portion thereof, the de-quantizer/IDCT circuit 3, the motion compensation circuit 4 and the display circuit 5 to set operation modes of these circuits. In the variable length decoding circuit portion of the parser/variable length decoder 2, coefficient data, etc., of cosine transformation, which is variable length coded, is decoded and sent to the de-quantizer/IDCT circuit 3.

In the de-quantizer/IDCT circuit 3, the coefficient data is restored to an appropriate scale by a de-quantizer portion thereof and the coefficient restored is transformed into a picture data by the IDCT portion thereof.

The motion compensation circuit 4 uses a motion vector information contained in the coded information obtained from the parser/variable length decoder 2 to read a reference picture data from the memory 12 through the motion compensation data read control circuit 8. Further, the reference picture data is added to the picture data generated by the IDCT portion of the de-quantizer/IDCT circuit 3 to obtain a decoded data. The decoded data is written in the memory 12 through the decoded data write circuit 9. In this case, when the decoded data is the I or P picture data, the decoded data is written in a reference picture area 121, 122 (FIGS. 7 and 8) of the memory 12, which store old data, to update the latter and, when it is the B picture data, it is written in the B picture area 123 (FIGS. 7 and 8) of the memory 12.

The decoded data written in the memory 12 is read out by using the display data read control circuit 10 and sent to the display circuit 5. Simultaneously therewith, the OSD data read circuit 11 reads the OSD data from an OSD data area 124 (FIGS. 7 and 8) of the memory 12, which will be described later, and the OSD data thus read is sent to the display circuit 5. Incidentally, the OSD data has been generated by an OSD data generator circuit (not shown) and written in the memory 12.

The display circuit 5 processes the decoded data read out from the memory 12 by performing, for example, a pixel rate transformation for, for example, the decoded data read out from the memory 12, displays it by overlaying the OSD data and outputs it as the picture data.

Figure 7:
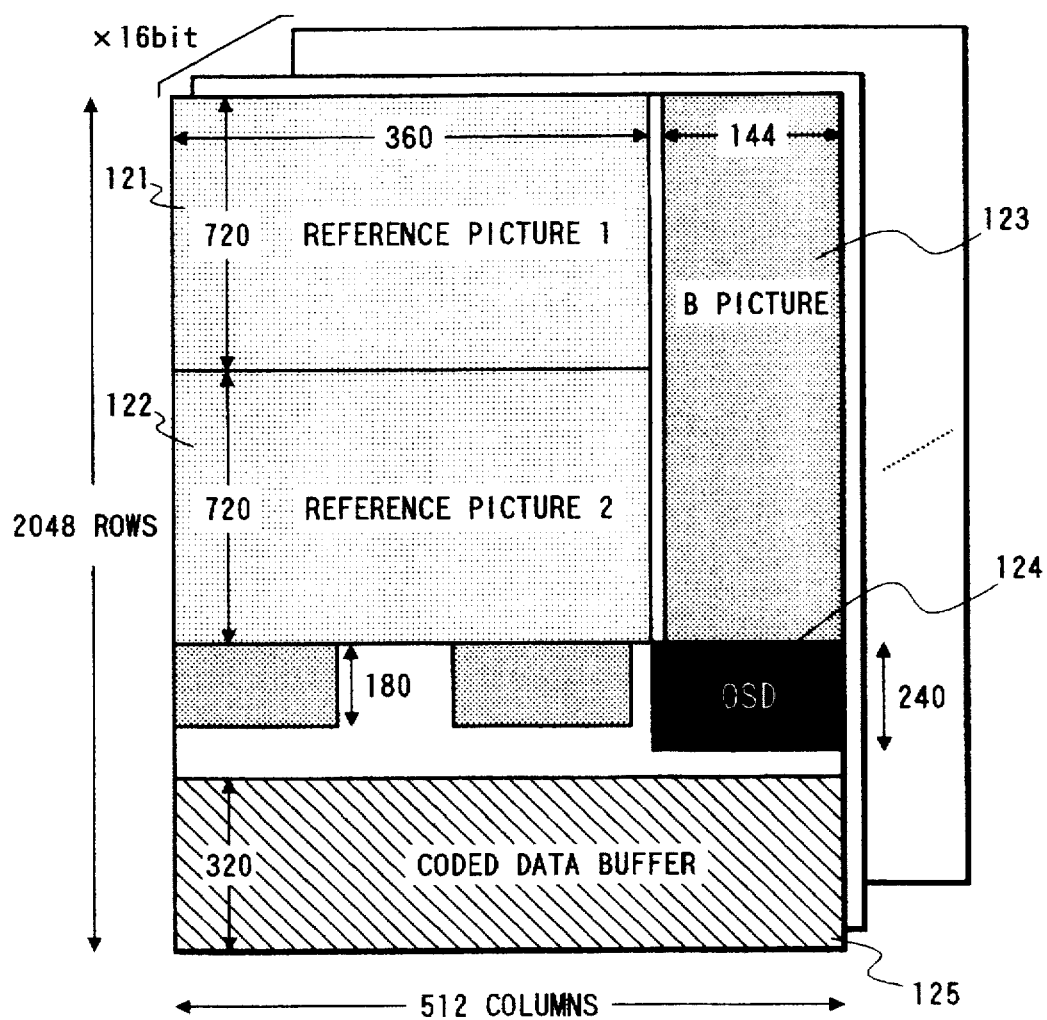
FIG. 7 shows an example of a first memory area dividing system of a picture decoder according to the present invention.
Figure 8:
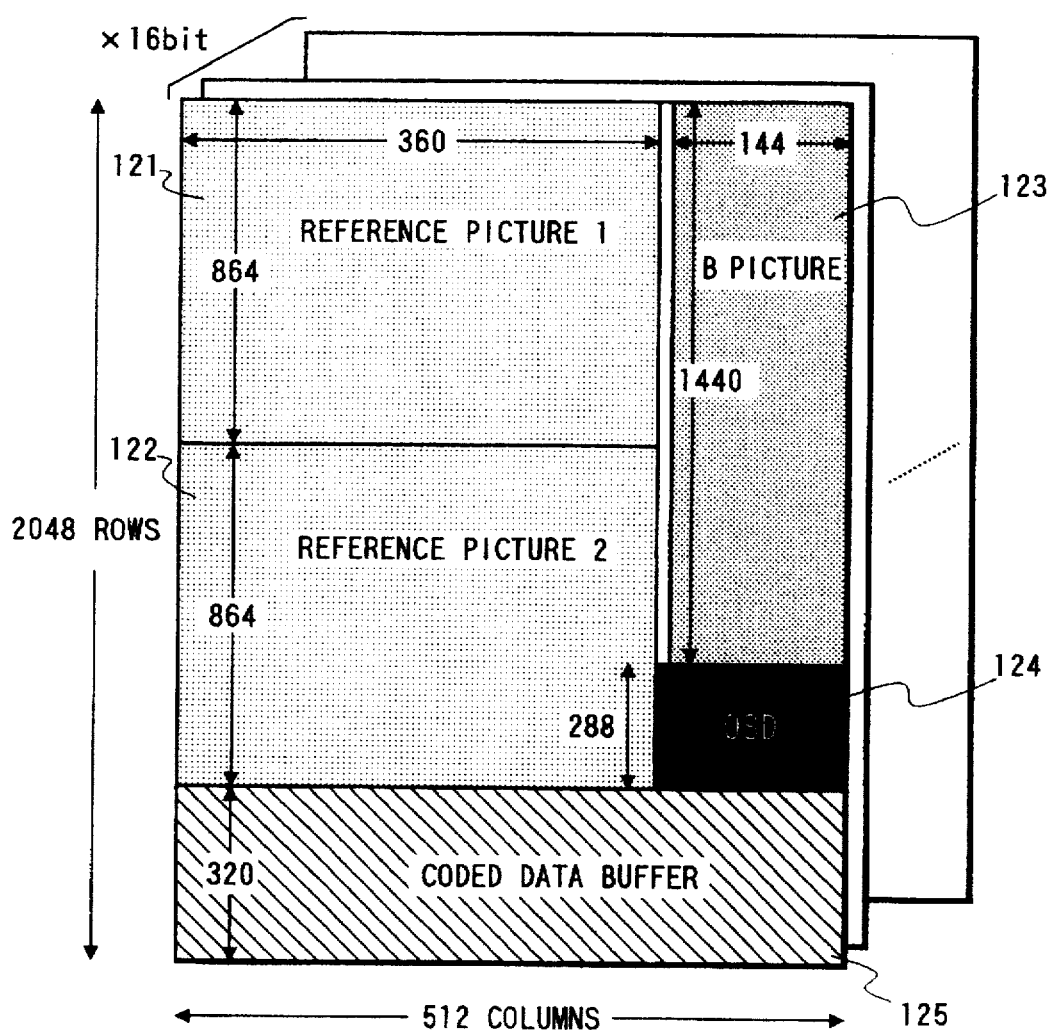
FIG. 8 shows an example of a second memory area dividing system of the picture decoder according to the present invention.

FIGS. 7 and 8 show patterns of the memory areas of the memory layers of the memory 12. The memory 12 is a 16 Mbits memory having data width of 16 bits, that is, 16 layers, and has a 2048 (rows)×512 (columns) matrix structure. The pattern shown in FIG. 7 is applied to a picture whose vertical size is 480 lines or less and the pattern shown in FIG. 8 is applied to a picture having vertical size of 480 to 576 lines. These two memory area patterns are automatically switched according to a picture size information of the coding mode information contained in the header portion of the decoded data by the parser/variable length decoder 2 shown in FIG. 1.

The patterns shown in FIGS. 7 and 8 include first reference picture regions 121, second reference picture regions 122, B picture regions 123, OSD data regions 124 and coded data regions 125, respectively.

In the memory area patterns shown in FIGS. 7 and 8, the coded data buffer areas 125 are identical in size and arranged in the same locations of the memory layers of the memory 12. With such construction, it becomes possible to write coded data in the coded data buffer area 125 continuously even in a connecting portion between data sequences of different picture sizes and to read it out. Further, it is possible to obtain the coded data buffer area 125 having size of 2,621,440 bits with which it is possible to minimize the influence of coding delay and the influence of a discontinuity of the coded data on the display picture data.

The first and second reference picture areas 121 and 122 of each pattern have capacities suitable to store pictures having maximum picture size, respectively. In the example shown in FIG. 7 which has an upper limit of picture size corresponding to the NTSC picture, the capacity of each of the reference picture areas 121 and 122 is 2 (bytes)×360 (columns)×(480×1.5) (rows)=4,147,200 bits, respectively, and, in the example shown in FIG. 8 which has an upper limit of picture size corresponding to the PAL picture, each reference picture area has 2 (bytes)×360 (columns)×(576× 1.5) (rows)=4,976,640 bits. When a picture size is smaller than the upper limit, the picture data is stored in that area starting from a left upper portion thereof.

The OSD data areas 124 of the patterns shown in FIGS. 7 and 8 are also assigned to substantially the same locations of the memory layers of the memory 12. Left upper corner positions of the OSD areas 124 are the same and the number of the lateral columns is commonly 76. However, the vertical size of the OSD data areas are 240 rows in FIG. 7 and 288 rows in FIG. 8 correspondingly to upper limits of possible picture sizes, respectively. When one row corresponds to 2 lines, for example, the OSD data area size in FIG. 7 corresponds to 2 areas each of 606 (pixels)×480/576 (lines) and that in FIG. 8 corresponds to 2 areas each of 2 (bits)×303 (pixels)×480/576.

Figure 6:
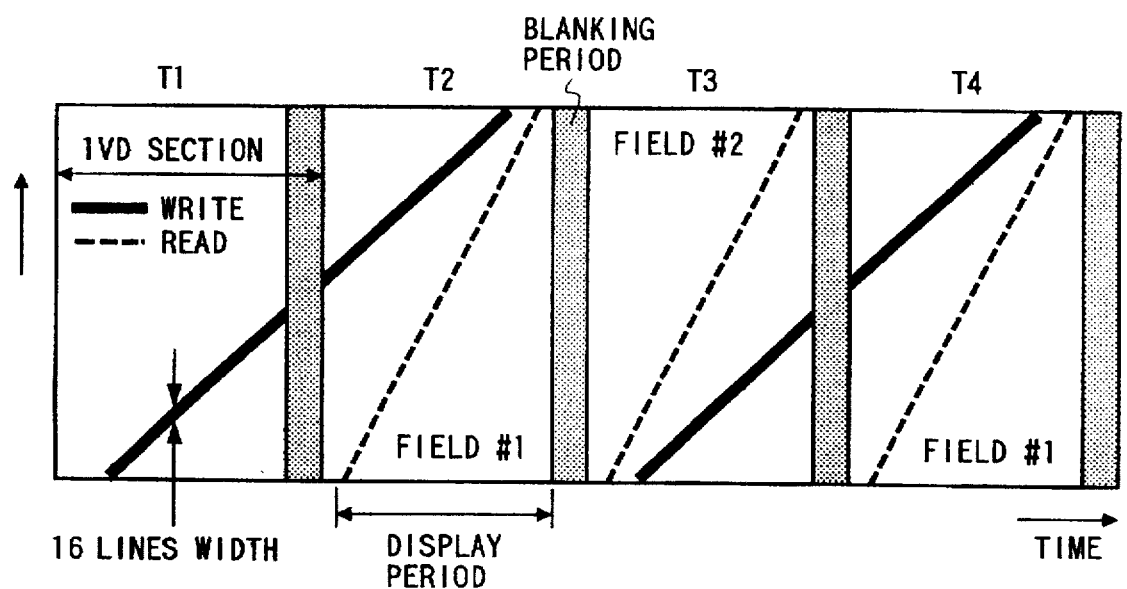
FIG. 6 shows a relation between memory write and memory read during a B picture decoding.

In the memory area patterns shown in FIGS. 7 and 8, the B picture areas 123 are much different. In FIG. 7, the B picture area 123 is divided to 3 segments while, in FIG. 8, it is not divided, a total memory size of the 3 segments of the B picture area in FIG. 7 being the same as that of the single B picture area in FIG. 8 which is the same as that of the first picture area as well as the second reference picture area which is 4,147,200 bits corresponding to 3 full frames. The picture data write and read with respect to the B picture area 123 can be performed by using the method described with reference to FIG. 6 and the display circuit 5 can process an inter-frame portion of the B picture in the same way as for the I or P picture.

In the pattern shown in FIG. 8, the single B picture area has a capacity of 3,317,760 bits corresponding to ⅔ of 1 frame. In this embodiment, a special control circuit to be described later is provided in the decoded data write circuit 10 and in the display data read circuit 11 correspondingly thereto. However, in this memory area pattern, it is possible to provide the coded data buffer having a large capacity and the OSD data area even when the picture size is large.

Figure 9:
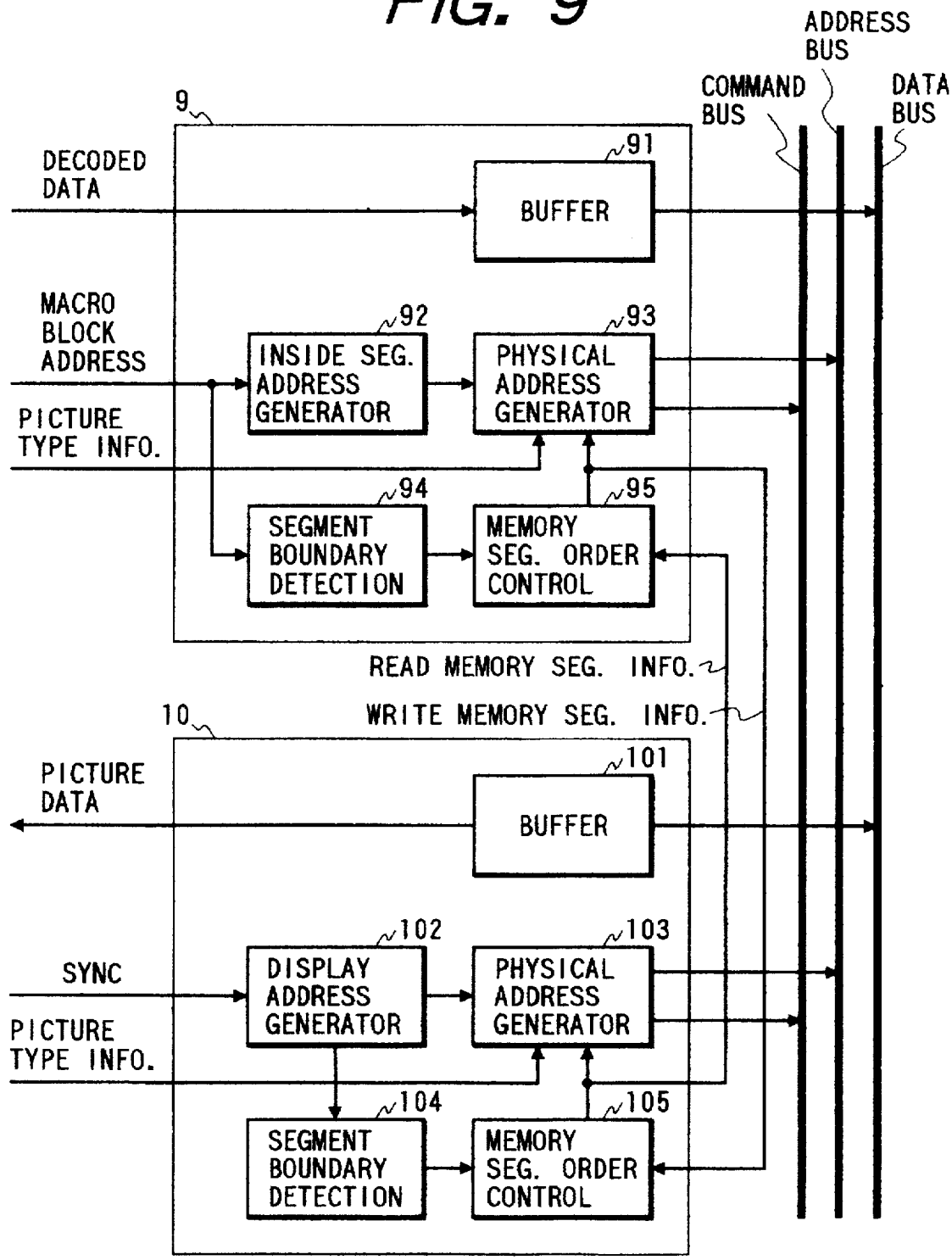
FIG. 9 shows an example of a decoded data write circuit and an example of a display data read circuit.

FIG. 9 shows an embodiment of the decoded data write circuit 9 and the display data read circuit 10. The embodiment in FIG. 9 will be described by taking write and read functions for writing and reading coded data of the B picture with respect to the B picture area 123 shown in FIG. 8 as an example. The decoded data write circuit 9 includes a buffer circuit 91, an inside segment address generator circuit 92, a physical address generator circuit 93, a segment boundary detection circuit 94 and a memory segment order control circuit 95. The display data read circuit 10 includes a buffer circuit 101, a display address generator circuit 102, a physical address generator circuit 103, a segment boundary detection circuit 104 and a memory segment order control circuit 105.

Figure 10:
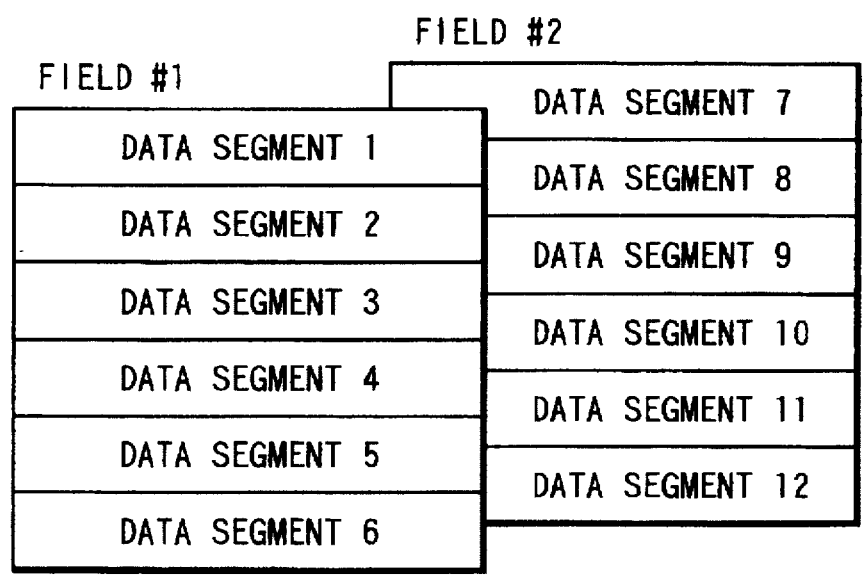
FIG. 10 shows an example of a data segment division for the B picture data.
Figure 11:
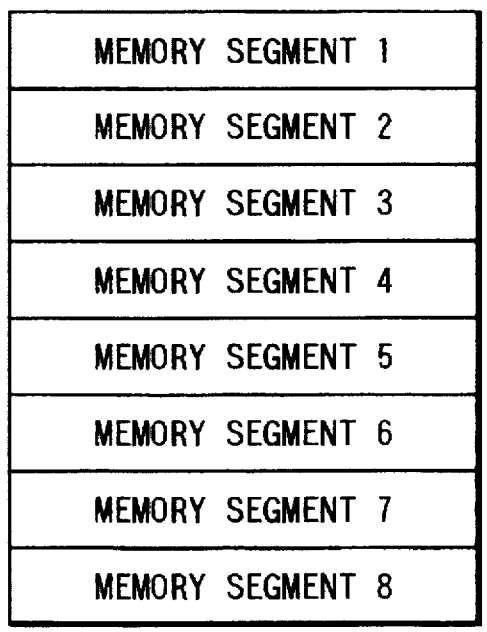
FIG. 11 shows an example of the memory division of the B picture memory area.

An operation of the circuit shown in FIG. 9 will be described with reference to FIGS. 10 and 11, in which FIG. 10 shows a division of the picture data to segments and FIG. 11 shows a division of the B picture memory area to segments.

As shown in FIG. 10, each of a first field and a second field of the B picture data is divided to an even number 2N (N being an integer) of data segments. That is, in the example in FIG. 10, N=3 and the first field is divided to data segments 1 to 6 and the second field is divided to data segments 7 to 12 and, thus, the B picture data is divided to 2×2N=4N=12 segments.

As shown in FIG. 11, the B picture memory area 123 is divided to 2(N+1) memory segments, that is, 8 segments. The capacity of each memory segment is made large enough to store corresponding data segment. Preferably, the capacities of the memory segments are identical.

Returning to FIG. 9, the decoded data write circuit 9 is input with a decoded picture data, a macro block address indicative of a position of the decoded picture data on a display screen in macro block unit and a picture type of the decoded picture data (information of picture, such as I, P or B picture and picture size). Since, when the picture type is I or P or when it is B picture having picture size of 480 lines or less, the capacity of the memory area for storing the decoded picture data is as large as 1 frame as mentioned with respect to FIGS. 7 and 8, it is not always necessary to process the picture data by segmenting it. However, in order to make the processing common for the case where the picture is B type having size exceeding 480 lines, the segmentation is performed even in the case of the B picture having size 480 lines or less.

The inside segment address generator circuit 92 obtains the position information of the decoded picture data on the display screen and generates an address signal indicative of an address within a data segment. The address signal is input to the physical address generator circuit 93 which transforms it into a physical address of the memory 12 on the basis of a combination of the address signal, the picture type information and, in the case where the picture is B picture having size exceeding 480 lines, the memory segment number from the memory segment order control circuit 95 to be described.

In order to compensate for a delay caused by physical address generation of the memory 12, etc., the buffer circuit 91 stores the decoded picture data temporarily and, in some case, it may rearrange the order of data segments in a portion of the picture data.

The segment boundary detection circuit 94 and the memory segment order control circuit 95 become effective only when the picture type is B and the size thereof exceeds 480 lines. When the decoded picture data is on a boundary between adjacent data segments, the segment boundary detection circuit 94 provides a boundary signal indicative of the fact to the memory segment order control circuit 95. The memory segment order control circuit 95 determines the memory segment number to which the decoded picture data segment is to be written on the basis of the boundary signal and the read memory segment information from the display data read circuit 10 and sends the memory segment number to the physical address generator circuit 93.

The display data read circuit 10 is further supplied with a sync information and the picture type information and outputs a display picture data. The display address generator circuit 102 generates a display address signal on the basis of the sync information and supplies it to the physical address generator circuit 103. The physical address generator circuit 103 generates the physical address of the memory 12 on the basis of the display address signal and the picture type information, except for the case where the picture data to be displayed is B picture having size exceeding 480 lines.

The buffer circuit 101 stores the display picture data read out from the memory 12 and further rearranges the order of the data segments in a portion of the picture data and transforms an information rate, etc.

The segment boundary detection circuit 104 and the memory segment order control circuit 105 become effective only when the decoded picture data indicates B picture having size exceeding 480 lines. The segment boundary detection circuit 104 supplies a boundary signal indicative of boundary of data segment to the memory segment order control circuit 105 when the picture data read out in response to the display address signal is on a boundary between adjacent data segments. The memory segment order control circuit 105 determines the memory segment number from which the display picture data is to be read out on the basis of the boundary signal and the write memory segment information from the decoded data write circuit 9 and supplies it to the physical address generator circuit 103.

Figure 12:
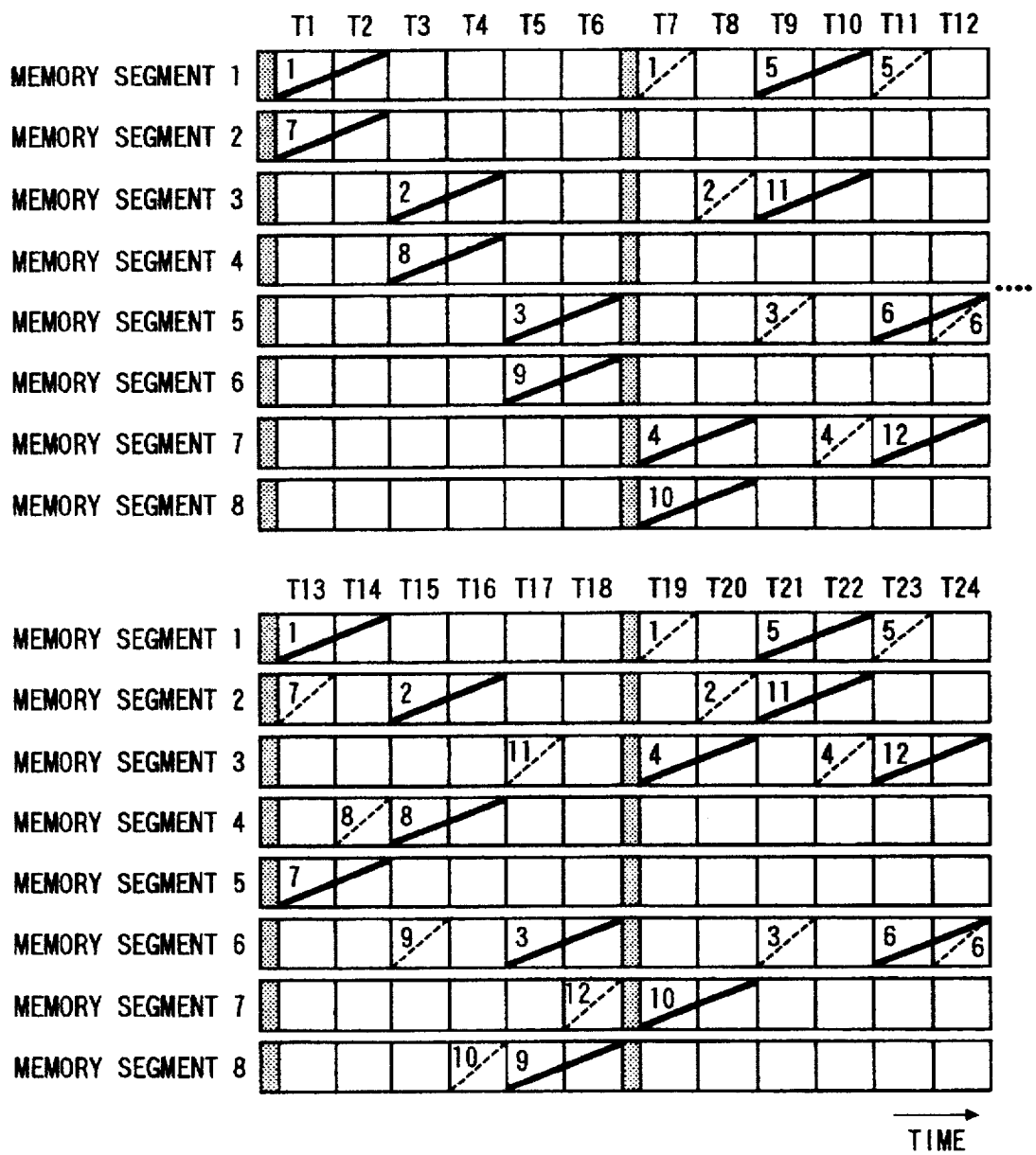
FIG. 12 shows a relation between the memory write and the memory read during the decoding of B picture, according to the present invention.

FIG. 12 is a timing chart of operations of the memory segment order control circuits 95 and 105 and shows write and read timing of 4N data segments with respect to 2(N+1) memory segments with time. That is, 1 field period of the picture data is divided to 6 substantially equal time periods and a time period T1–T6 corresponds to a first field, T7–T12 to a second field, T13–T18 to a third field and T19–T24 to a fourth field.

Figure 13:
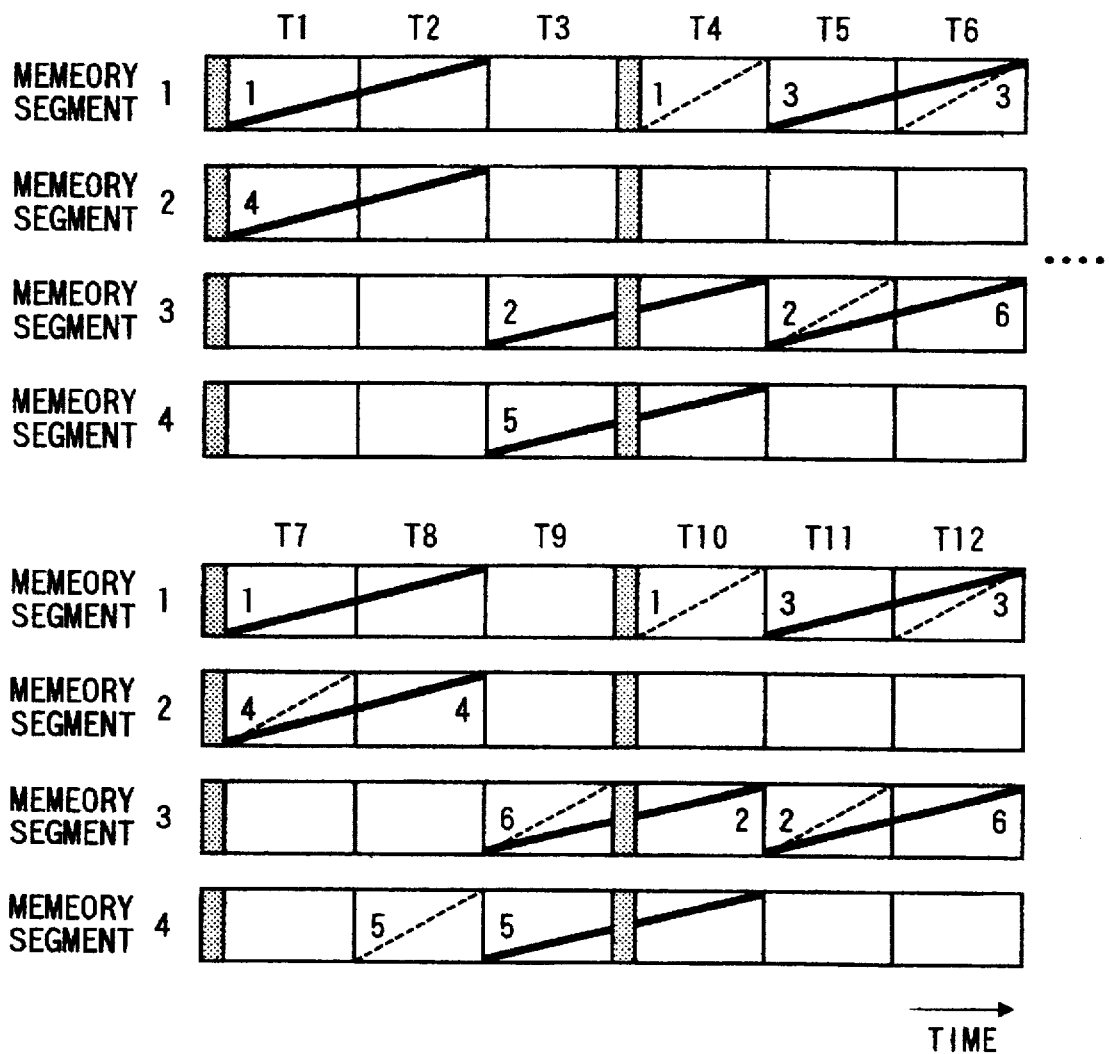
FIG. 13 shows another relation between the memory write and the memory read during the decoding of B picture.

FIG. 13 is a timing chart for a case where the number of memory segments is (M+1) and the number of data segments is 2M, where M is an odd integer, for a comparative example with the example shown in FIG. 12 where there are 2(N+1) memory segments and 4N data segments. In FIG. 13, M=3 and therefore there are 4 memory segments and 6 data segments. Also in this case, the capacity of the B picture memory area is ⅔ frames as in FIG. 12 and the memory area pattern shown in FIG. 8 is used commonly. In FIG. 13, the memory segment size and the data segment size are twice those shown in FIG. 12, respectively, and the number of memory segments and the number of data segments are ½ of those shown in FIG. 12, respectively. Therefore, 1 field period is divided to 3 substantially equal periods as shown in FIG. 13.

Figure 4:
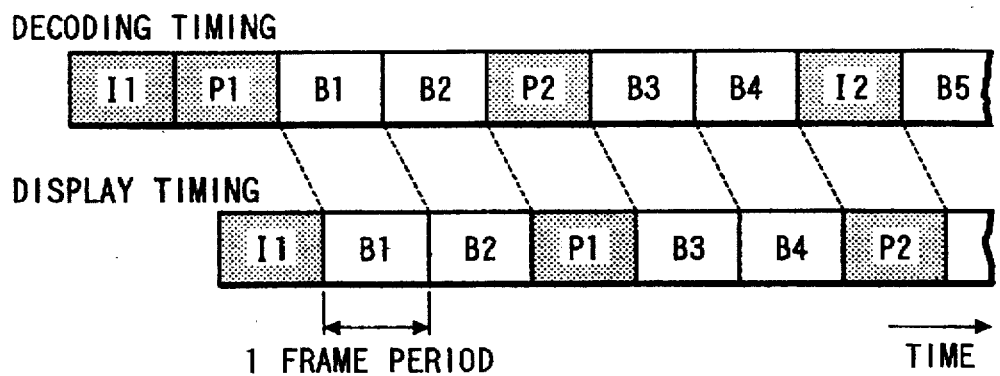
FIG. 4 is a timing chart for decoding and displaying picture data.
Figure 5:
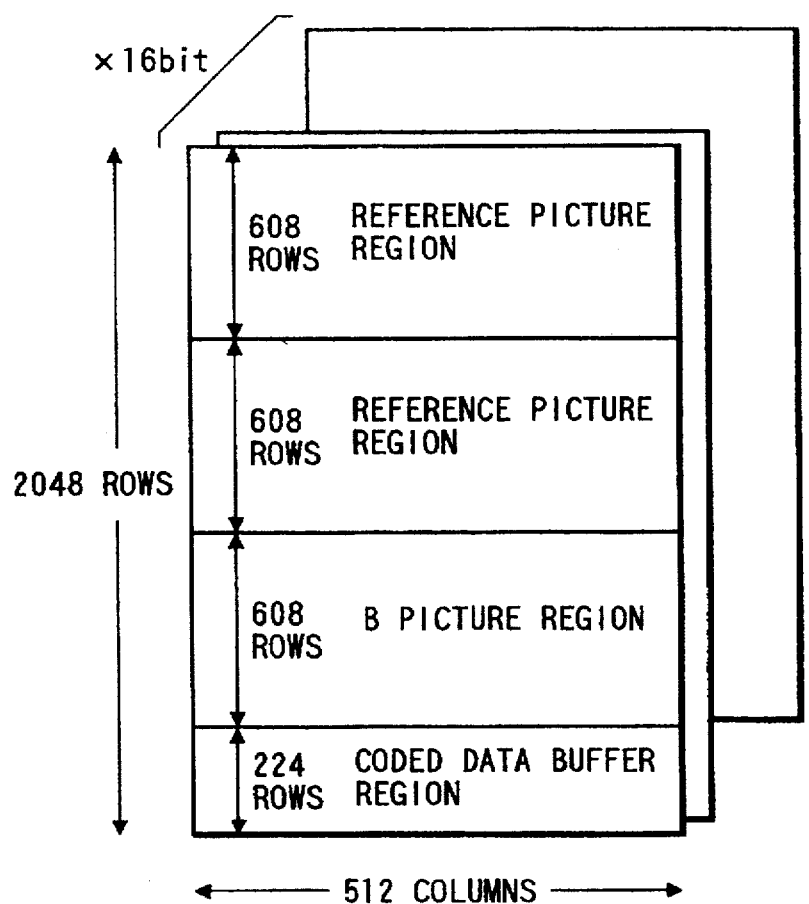
FIG. 5 shows an example of a memory area dividing system of a picture decoder.

Referring to FIG. 12, in the time period T1–T6, the decoded picture data (B picture) is merely written without read operation. That is, in this time period, the reference picture data is read out with the timing shown in FIG. 4. In FIG. 12, solid lines indicate a write operation and dotted lines indicate a read operation. Numerals attached to the solid lines and the dotted lines indicate the data segment numbers. As shown in FIG. 10, the data segment numbers 1 to 6 indicate the data of the first field and 7 to 12 indicate the data of the second field.

In the time period T1–T6, first picture data (data segments 1, 7, 2, 8, 3, 9) are written in the memory segments 1 to 6 sequentially. The picture data written in this period corresponds to ½ frames and the data of the odd numbered data segments is data of the first field and that of the even numbered segments is data of the second field. In the period T7 to T8, first data (data segments 4 and 10) are written in the respective memory segments 7 and 8 and, simultaneously, data of the data segments 1 and 2 are read out from the memory segments 1 and 3. The memory segments 1 and 3 read out are the read out memory segment information shown in FIG. 9. Since data in other memory segments than the memory segments 1 and 3 are not read out as yet, the memory segment order control circuit 95 determines memory segment numbers in the succeeding periods such that decoded data are written in these memory segments. In the period T9 to T10, data segments 3 and 4 are read out from the memory segments 5 and 7 and, in the next period T11 to T12, data segments 6 and 12 are written in the memory segments 5 and 7. In the period T13 to T14, the data segments 1 and 7 are written in the memory segments 1 and 5, and so on. In this manner, the memory segment order control circuit 95 determines the memory segment numbers to be written with data segments sequentially.

The write memory segment information functions to correspond the data segment number to the memory segment number to be written with the data segment. For example, it is assumed that, in the period T1 to T2 and the period T13 to T14, the data segments 1 and 7 of the first field are written in some memory segments, respectively. In such case, the memory segment order control circuit 105 receives the write segment numbers (1 and 2 in the period T1 to T2 and 1 and 7 in the period T13 to T14) as the write memory segment information and writes the correspondence between the data segments and the memory segments in a data segment-memory segment correspondence table provided in the circuit. For example, in the period T15 to T16, the data segments 9 and 10 are to be read out. However, since the facts that the data segment 9 is written in the memory segment 6 and that the data segment 10 is written in the memory segment 8 were registered in the data segment-memory segment correspondence table in the period T5 to T6 and in the period T7 to T8, respectively, the memory segment order control circuit 105 determines data segment and position of the period in the frame from which the data is to be read out to determine the memory segment number which stores the data to be read out from the data segment-memory segment correspondence table.

In FIG. 13, the memory segments are used in the same rules as in FIG. 12. Only difference of operation shown in FIG. 13 from that in FIG. 12 resides in the period in which there is a conflict between write and read. In FIG. 12, the conflict occurs in the periods T12 and T24, which is the same as the example shown in FIG. 4, in which the memory capacity of 1 frame is assigned to the B picture, in that conflicts occur in the last periods of the frames. On the other hand, in the example shown in FIG. 13, conflicts occur in not only the last periods (T6, T12) of the frames but also the first period T7 of the second frame and the periods T5 and T11 which correspond to substantially a center of the screen. This means that, when the read operation is predominant, the write periods must be reduced and that the write timing, that is, the decoding timing, of the B picture must be changed from that of the I or P picture. On the other hand, in the example shown in FIG. 12, the dividing number of the data segments as well as the dividing number of the memory segments is twice that of the case shown in FIG. 13 and therefore the write timing, that is, the decoding timing, can be made common for the B picture and the I or P picture.

Although the memory capacity is ⅔ frames in FIG. 12 as well as FIG. 13, it is obvious for those skilled in the art that the memory capacity can be reduced to 9/16 frames by dividing the data to 16 segments and the memory area to 9 segments. Further, although this embodiment has been described as to reduction of the memory capacity for both the luminance signal and the chrominance signal, it is possible to apply this only to the luminance signal and assign 1 frame capacity to the chrominance signal.

As described hereinbefore, according to the present invention, it is possible to provide a large buffer area for coded data enough to store a large picture of the PAL system and a data area for the OSD, within the capacity of 16 bits.

Further, it is possible to set a coded data buffer area for a coded data of a picture having different size in the same space and to perform a smooth decoding operation even in a connecting point between sequences of data of pictures having different picture sizes.

In addition, the time period for which the decoding operation has to keep be stopped is small and it is possible to the decoding operation identical regardless of the picture type, I, P or B picture.

What is claimed is:

1. A memory control system for use in a picture decoding device for decoding a coded data obtained by inter-frame coding an interlaced picture of a television, comprising:

a memory means having a predetermined capacity and a plurality of memory area patterns corresponding to sizes of coded pictures, each memory area pattern including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture; and a control means for automatically selecting one of said memory area patterns of said memory means according to the size of coded pictures, such that, when a size of a coded picture is equal to or less than 480 effective lines in vertical picture size, a capacity of said display data area corresponds to at least 1 frame and, when a size of coded picture is more than 480 effective lines in vertical picture size, the capacity of said display data area corresponds to a value smaller than 1 frame.

2. The memory control system according to claim 1, wherein said coded data buffer area of said each memory area pattern is arranged in an address space common to said each memory area pattern.

3. The memory control system according to claim 1, wherein an address space of said OSD data area of said memory area pattern corresponding to said size of a coded picture more than 480 effective lines in vertical picture size includes the address space of said OSD data area of said memory area pattern corresponding to said size of a coded picture equal to or less than 480 effective lines in vertical picture size, and a capacity of the OSD data area is increased with the size of a coded picture.

4. The memory control system according to claim 1, wherein said display data area of said memory area pattern corresponding to said size of a coded picture more than 480 effective lines in vertical picture size has a capacity of 2(N+1)/4N of 1 frame and is divided to 2(N+1) memory segments, where N is an integer, and wherein the picture data is written in and read out from said memory segments in picture data unit corresponding to ¼N frames.

5. A picture decoder for decoding a coded picture data obtained by inter-frame coding an interlaced picture, comprising:

memory means including a plurality of picture data memory layers corresponding in number to sizes of coded picture, said picture data memory layers having different memory area patterns each including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture;

means for selecting one of said picture data memory layers of said memory means according to the size of the coded picture data, such that, when the size of the coded picture is equal to or less than 480 effective lines in vertical picture size, a capacity of said display data area is at least 1 frame and, when the size of the coded picture is more than 480 effective lines in vertical picture size, the capacity of said display data area is smaller than 1 frame;

means for writing the coded picture data in said coded data buffer area of said memory means;

means for reading the coded data from said coded data buffer area in first-in, first-out at a rate of 1 picture per frame period;

means for decoding the coded data read from said coded buffer area;

means for writing the decoded data in said display data memory area of said picture data memory layer; and means for reading the decoded data from said display data memory area of said picture data memory layer.

6. The picture decoder according to claim 5, wherein said coded data buffer area of the plurality of said picture data memory layers are arranged in the same address spaces of said respective picture data memory layers.

7. The picture decoder claimed in claim 5, wherein an address space of said OSD data area of said picture data memory layer corresponding to said size of a coded picture more than 480 effective lines in vertical picture size includes an address space of said ODS data area of said picture data memory layer corresponding to said size of a coded picture equal to or less than 480 effective lines in vertical picture size, the coded picture size.

8. The picture decoder claimed in claim 5, wherein said display data area of said picture data memory layer corresponding to said size of a coded picture more than 480 effective lines in vertical picture size has a capacity of 2(N+1)/4N of 1 frame and is divided to 2(N+1) memory segments, where N is an integer, and wherein the picture data is written in and read out from said memory segments in picture data unit corresponding to ¼N frames.

9. The picture decoder according to claim 5, wherein said decoded data write means comprises a memory segment sequence control means responsive to a read memory segment information supplied from said display data read means for determining a write segment, and wherein said display data read means comprises a segment sequence control means responsive to a segment write information supplied from said decoded data write means for determining a read segment.

10. A picture decoder for decoding a coded picture data obtained by inter-frame coding an interlaced picture of a television, comprising:

a memory means having a predetermined capacity and a plurality of memory area patterns corresponding to sizes of coded picture data, each memory area pattern including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture;

a means for selecting one of said memory area patterns of said memory means according to the sizes of the coded picture data, such that, when a size of a coded picture data is equal to or less than 480 effective lines in vertical picture size, a capacity of said display data area is at least 1 frame and, when a size of a coded picture data is more than 480 effective lines in vertical picture size, the capacity of said display data area is smaller than 1 frame;

a means for writing coded picture data in said coded data buffer area of said memory means;

a means for reading coded data from said coded data buffer area in first-in, first-out at a rate of 1 picture per a frame period approximately;

a means for decoding coded data read from said coded buffer area;

a means for writing decoded data in said display data memory area or said reference picture data memory areas of said memory means; and a means for reading decoded data from said display data memory area or said reference picture data memory areas of said memory means.

11. The picture decoder according to claim 10, wherein said coded data buffer area of said each memory area pattern is arranged in an address space common to said each memory area pattern.

12. The picture decoder according to claim 10, wherein an address space of said OSD data area of said memory area pattern corresponding to said size of a coded picture more than 480 effective lines in vertical picture size includes an address space of said OSD data area of said memory area pattern corresponding to said size of a coded picture equal to or less than 480 effective lines in vertical picture size, and a capacity of the OSD data area increases with the size of a coded picture.

13. The picture decoder according to claim 10, wherein said display data area of said memory area pattern corresponding to said size of a coded picture more than 480 effective lines in vertical picture size has a capacity of 2(N+1)/4N of 1 frame and is divided to 2(N+1) memory segments, where N is an integer, and wherein the picture data is written in and read out from said memory segments in picture data unit corresponding to ¼N frames.

14. The picture decoder according to claim 10, wherein said means for writing decoded data comprises a memory segment sequence control means responsive to read memory segment information supplied from said means for reading decoded data for determining a write segment, and wherein said means for reading decoded data comprises a segment sequence control means responsive to segment write information supplied from said means for writing decoded data for determining a read segment.

15. A memory control system for use in a picture decoding device for decoding a coded data obtained by inter-frame coding an interlaced picture, comprising:

memory means including a plurality of picture data memory layers corresponding in number to sizes of coded picture, said picture data memory layers having different memory area patterns each including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture;

control means for automatically selecting one of said picture data memory layers of said memory means according to the size of coded picture, such that, when the size of coded picture is equal to or less than 480 effective lines in vertical picture size, a capacity of said display data area corresponds to at least 1 frame and, when the size of coded picture is more than 480 effective lines in vertical picture size, the capacity of said display data area corresponds to a value smaller than 1 frame; and wherein said coded data buffer area of the plurality of said picture data memory layers are arranged in the same address spaces of said respective picture data memory layers.

16. A memory control system for use in a picture decoding device for decoding a coded data obtained by inter-frame coding an interlaced picture, comprising:

memory means including a plurality of picture data memory layers corresponding in number to sizes of coded picture, said picture data memory layers having different memory area patterns each including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture;

control means for automatically selecting one of said picture data memory layers of said memory means according to the size of coded picture, such that, when the size of coded picture is equal to or less than 480 effective lines in vertical picture size, a capacity of said display data area corresponds to at least 1 frame and, when the size of coded picture is more than 480 effective lines in vertical picture size, the capacity of said display data area corresponds to a value smaller than 1 frame; and wherein an address space of said OSD data area of said picture data memory layer corresponding to said size of a coded picture more than 480 effective lines in vertical picture size includes the address space of said ODS data area of said picture data memory layer corresponding to a small picture size and is substantially proportional to the coded picture size.

17. A memory control system for use in a picture decoding device for decoding a coded data obtained by inter-frame coding an interlaced picture, comprising:

memory means including a plurality of picture data memory layers corresponding in number to sizes of coded picture, said picture data memory layers having different memory area patterns each including two reference picture data memory areas each having a capacity of at least 1 frame, at least a display data memory area for transforming a frame structure data into a field structure data, a coded data buffer area for temporarily storing the coded data and an OSD data area for storing on-screen-data to be overlaid on a decoded picture;

control means for automatically selecting one of said picture data memory layers of said memory means according to the size of coded picture, such that, when the size of coded picture is equal to or less than 480 effective lines in vertical picture size, a capacity of said display data area corresponds to at least 1 frame and, when the size of coded picture is more than 480 effective lines in vertical picture size, the capacity of said display data area corresponds to a value smaller than 1 frame; and wherein said display data area of said picture data memory layer corresponding to said size of a coded picture more than 480 effective lines in vertical picture size has a capacity of $2(N+1)/4N$ of 1 frame and is divided to $2(N+1)$ memory segments, where N is an integer, and wherein the picture data is written in and read out from said memory segments in picture data unit corresponding to $1/4N$ frames.

18. A memory control system for a picture decoding device, comprising:

a memory having a predetermined size and a plurality of memory area patterns corresponding to sizes of coded pictures, each memory area pattern including two reference picture data memory areas each having a capacity of at least one frame, at least a display data memory area, a coded data buffer area, and an OSD data area; and a controller coupled to said memory, said controller automatically selecting one of said memory area patterns according to the size of coded pictures such that when a size of a coded picture is equal to or less than 480 effective lines in vertical picture size, a size of said display data area corresponds to at least one frame and, when a size of coded picture is more than 480 effective lines in vertical picture size, a size of said display data area corresponds to a value smaller than 1 frame.

19. A method for controlling a memory in a picture decoding device for decoding a coded data obtained by inter-frame coding of an interlaced picture of a television, the method comprising the steps of:

providing a plurality of memory area patterns for a predetermined sized memory, each of said memory area patterns corresponding to a coded picture size and including two reference picture data memory areas, at least a display data memory area, a coded data buffer area, and an OSD data area;

automatically selecting one of said plurality of memory area patterns in accordance with a coded picture size to be decoded, such that when a coded picture size is equal to or less than 480 effective lines in vertical picture size, a capacity of the display data area corresponds to at least one frame and, when the coded picture size is more than 480 effective lines in vertical picture size, the capacity of the display data area corresponds to a value less than 1 frame.

* * * * *